United States Patent [19]

Sugano

[11] Patent Number: 4,595,088
[45] Date of Patent: Jun. 17, 1986

[54] HYDRAULIC CONTROL SYSTEM FOR LOCK-UP CLUTCH

[75] Inventor: Kazuhiko Sugano, Zama, Japan

[73] Assignee: Nissan Motor Co., Ltd., Yokohama, Japan

[21] Appl. No.: 539,695

[22] Filed: Oct. 6, 1983

[51] Int. Cl.[4] ............................................. B60K 41/02
[52] U.S. Cl. ................................ 192/0.076; 192/3.31; 192/103 R
[58] Field of Search ................... 192/0.075, 0.076, 3.31, 192/3.57, 3.58, 103 R

[56] References Cited

U.S. PATENT DOCUMENTS

| | | | |
|---|---|---|---|
| 3,068,974 | 12/1962 | Jandasek | 192/3.31 X |
| 3,691,872 | 9/1972 | Schaefer et al. | 74/864 |
| 4,095,486 | 6/1978 | Ohnuma | 74/645 |
| 4,289,048 | 9/1981 | Mikel et al. | 74/733 |
| 4,305,487 | 12/1981 | Sunohara | 192/3.28 |
| 4,438,665 | 3/1984 | Schmidt | 74/867 |
| 4,441,385 | 4/1984 | Taga et al. | 192/3.31 X |
| 4,457,411 | 7/1984 | Hiramatsu | 192/3.31 |

FOREIGN PATENT DOCUMENTS

| | | |
|---|---|---|
| 37050 | 3/1981 | European Pat. Off. . |
| 2853115 | 6/1980 | Fed. Rep. of Germany . |
| 2478553 | 2/1981 | France . |
| 55-109854 | 8/1980 | Japan ........................ 192/3.31 |
| 55-38539 | 10/1980 | Japan . |
| 1270890 | 4/1972 | United Kingdom . |
| 2017842 | 10/1979 | United Kingdom . |
| 2097492 | 11/1982 | United Kingdom . |
| 2115505 | 9/1983 | United Kingdom . |

*Primary Examiner*—Allan D. Herrmann
*Attorney, Agent, or Firm*—Schwartz, Jeffery, Schwaab, Mack, Blumenthal & Evans

[57] ABSTRACT

A hydraulic control system for a lock-up clutch includes a vehicle speed cut valve having a spool movable responsive to a governor fluid pressure between a lock-up position and a non lock-up position. A solenoid valve is provided which is energized such as during coasting of the vehicle or during kickdown operation. When energized, the solenoid valve applies a line fluid pressure to the spool against the governor fluid pressure to forcibly move it to the non lock-up position so as to release the lock-up clutch.

3 Claims, 3 Drawing Figures

HYDRAULIC CONTROL SYSTEM FOR LOCK-UP CLUTCH

CROSS REFERENCE TO RELATED APPLICATIONS

References are made to the following related copending applications, each filed in the name of Kazuhiko Sugano: (1) U.S. patent application Ser. No. 494,647 filed on May 16, 1983 now U.S. Pat. No. 4,561,528; (2) U.S. patent application Ser. No. 507,228 filed on June 23, 1983. References are also made to the following related copending applications, each filed in the name of Kazuhiko Sugano; (3) U.S. patent application Ser. No. 538,427, filed Oct. 3, 1983; (4) U.S. patent application Ser. No. 538,276, filed Oct. 3, 1983; (5) U.S. patent application Ser. No. 538,278, filed Oct. 3, 1983.

BACKGROUND OF THE INVENTION

The present invention relates to a hydraulic control system for a lock-up clutch of a hydrodynamic device of an automatic transmission for a vehicle.

In the case of automatic transmissions having a hydrodynamic device, such as a torque converter, with a lock-up clutch, the lock-up clutch is kept engaged when the vehicle speed is higher than a predetermined value during operation with a predetermined gear ratio or speed ratio. One of such hydraulic control systems is described in U.S. Pat. No. 4,369,865 issued Jan. 25, 1983 to Sunohara et al. The known hydraulic control systems of the above kind pose the following problems. The first problem is in that since the lock-up clutch is left engaged as long as the above mentioned travelling condition is satisfied even if the vehicle is coasting, the vibrations from the engine is transmitted to the drive system and thus the driveablity is degraded. The second problem is in that the engine revolution speed during coasting operation is elevated when the lock-up clutch is engaged as compared to the case when the lock-up clutch is not engaged and thus fuel economy during coasting operation is poor as compared to the latter case. The engine revolution speed is elevated because there is no slip when the lock-up clutch is engaged during coasting operation.

SUMMARY OF THE INVENTION

According to the present invention, a hydraulic control system comprises a valve having a spool movable between a lock-up position and a non lock-up position, means for hydraulically engaging a lock-up clutch when the spool assumes the lock-up position thereof and releasing the lock-up clutch when the spool assumes the non lock-up position thereof, and means coupled with the valve for forcing the spool to assume the non lock-up position thereof such as during coasting operation or kickdown operation.

Accordingly, an object of the present invention is to provide a hydraulic control system for a lock-up clutch wherein the lock-up clutch is released during coasting operation or kickdown operation.

DETAILED DESCRIPTION OF THE INVENTION

Figure 1:
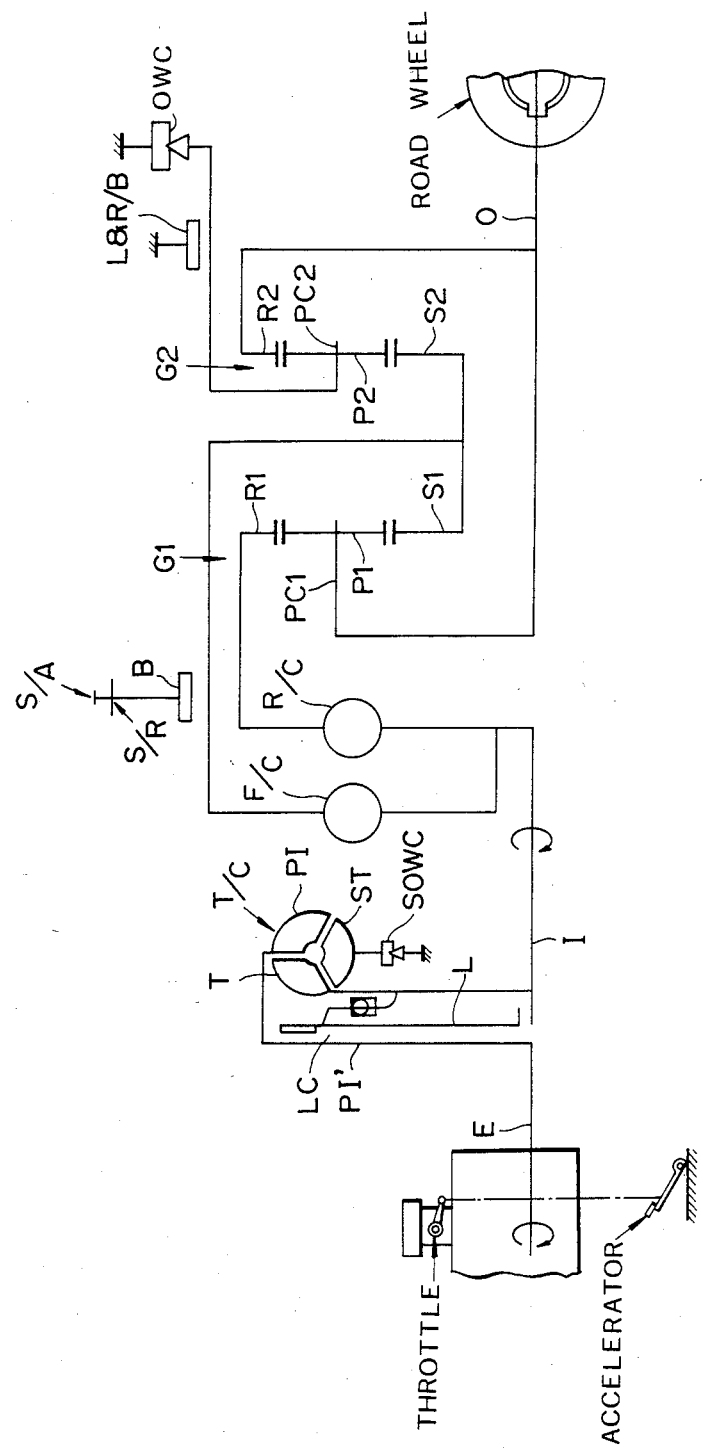
FIG. 1 is a schematic view of a power transmission mechanism of a three-speed automatic transmission.
Figure 2:
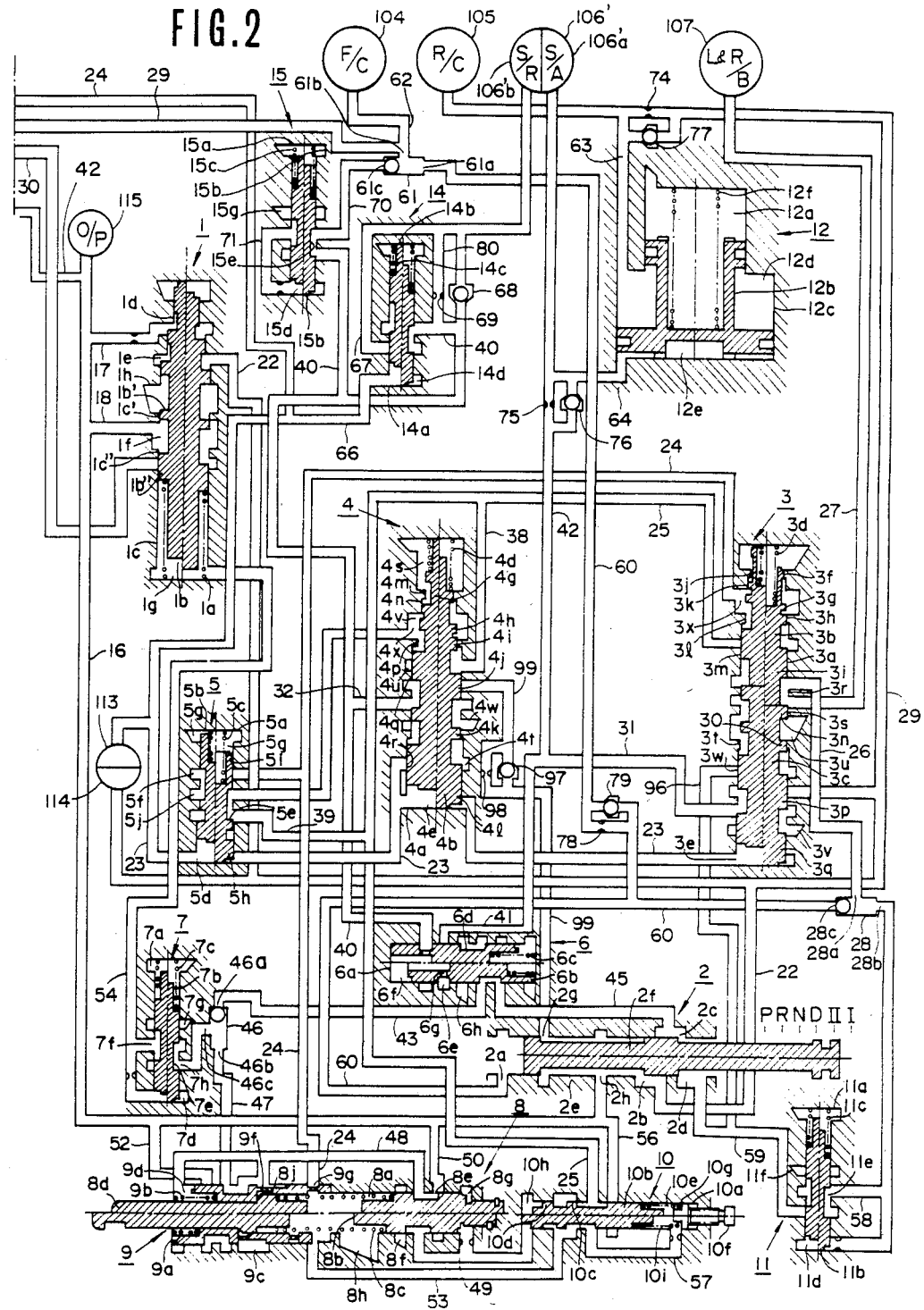
FIGS. 2 and 3, when combined, illustrate a circuit diagram of a hydraulic control system according to the present invention.
Figure 3:
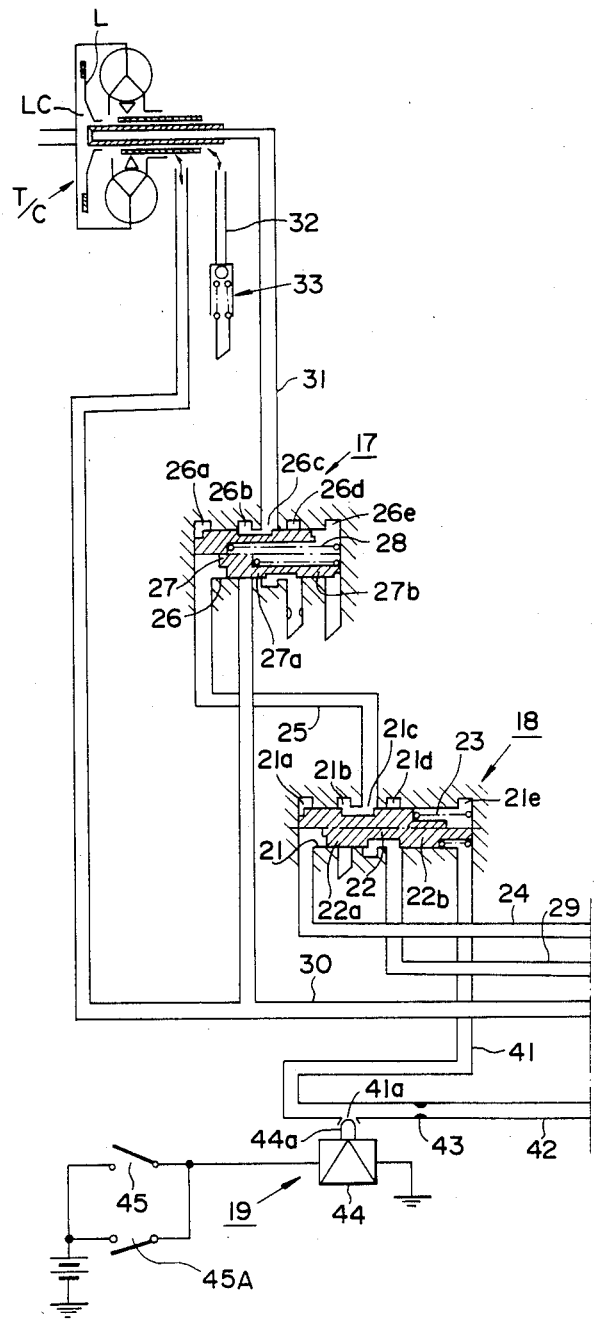

Referring to FIGS. 1 to 3, the preferred embodiment according to the present invention is described.

Referring to FIG. 1, there is shown a schematic view of a power transmission mechanism of a three-speed automatic transmission having three forward speed ratios and one reverse speed ratio. This power transmission comprises an input shaft I to which rotary power is delivered from an engine output shaft E via a torque converter T/C, an output shaft O which transmits driving power to a final drive, a first planetary gear set G1, a second planetary gear set G2, a front clutch F/C, a rear clutch R/C, a band brake B, a low and reverse brake L&R/B, and one-way clutch OWC. The first planetary gear set G1 comprises an internal gear R1, a sun gear S1, and a carrier PC1 carrying pinion gears P1 meshing with the sun gear S1 and internal gear R1 simultaneously. The second planetary gear set G2 comprises an internal gear R2, a sun gear S2, and a carrier PC2 carrying pinion gears P2. The carrier PC1 is connected to an output shaft O, while the sun gear S1 is connectable with an input shaft I via the front clutch (which may be called as a high and reverse clutch) F/C, and the internal gear R1 is connectable to the input shaft I via the rear clutch R/C. The internal gear R2 is connected to the output shaft O, and the sun gear S2 is connected to the sun gear S1. The carrier PC2 is prevented from rotating in its reverse direction by the one-way clutch OWC. A low and reverse brake L&R/B is arranged to anchor the carrier PC2. The band brake B is arranged to anchor the sun gears S1 and S2. This band brake B is actuated by a servo having a servo-apply chamber S/A and a servo-release chamber S/R. When the fluid pressure is applied to the servo-apply chamber S/A, the band brake B is applied, while when the fluid pressure is applied to the servo-release chamber S/R, the band brake B is released irrespective of the presence of the fluid pressure in the servo apply chamber S/A. The torque converter T/C includes a pump impeller PI, a turbine runner T, a stator ST and a lock-up clutch L. The pump impeller PI is connected via a torque converter cover PI' to the engine output shaft E. The turbine runner T is connected to the input shaft I, and the stator ST is connected via a one-way clutch SOWC to a stationary portion of the transmission. The lock-up clutch L connected to the turbine runner T is axially movable and defines a lock-up clutch fluid pressure chamber LC in cooperation with the torque converter cover PI'. The lock-up clutch L is pressed against the torque converter cover PI' when fluid pressure in the lock-up clutch fluid pressure chamber LC is lower than that within the torque converter T/C and rotates integrally with the torque converter cover PI'. The detail construction of the lock-up clutch L is described in U.S. Pat. No. 4,305,487 issued Dec. 15, 1981 to Sunohara.

The front clutch F/C, rear clutch R/C, band brake B and low and reverse brake L&R/B (one-way clutch OWC) are engageable in the predetermined combinations shown by the following Table to provide three forward speed ratios and one reverse speed ratio.

TABLE

| | F/C | R/C | L&R/B (OWC) | B S/A | SR |
|---|---|---|---|---|---|
| First | | o | o | | |

TABLE-continued

| | F/C | R/C | L&R/B (OWC) | B S/A | B SR |
|---|---|---|---|---|---|
| Second speed | | o | | o | |
| | | | | o | |
| Third speed | o | o | | | |
| | | | | o | o |
| Reverse | o | | o | | |
| | | | | | o |

In the Table, the sign "o" indicates for each of clutches and brakes, the clutch or brake in question is engaged or applied. What is denoted by a label (OWC) below the brake B1 means that the first speed ratio is established by the one-way clutch OWC even if the brake B1 is not applied. However, in this first speed ratio, it is not possible for the output shaft O to drive the engine (that is, no engine braking is provided). What is indicated by the sign "o" in the column below B means that the servo apply chamber S/A and/or servo release chamber S/R in question are supplied with fluid pressure.

Referring to FIGS. 2 and 3, the hydraulic control system comprises a regulator valve 1, a manual valve 2, a 1-2 shift valve 3, a 2-3 shift valve 4, a 3-2 downshift valve 5, a line pressure booster valve 6, a pressure modifier valve 7, a throttle valve 8, a throttle fail-safe valve 9, a throttle modulator valve 10, a first manual range pressure reducing valve 11, an accumulator 12, a 3-2 timing valve 14, a front clutch pressure reducing valve 15, governor valves 113, 114, a lock-up valve 17, a vehicle speed cut valve 18. As illustrated, these valves are connected with the torque converter T/C, lock-up clutch fluid chamber LC, front clutch F/C, rear clutch R/C, servo apply chamber S/A of the band brake B, servo release chamber S/R of the band brake B, low and reverse brake L&R/B, and oil pump O/P. The hydraulic control system is substantially the same as that of co-pending U.S. patent application Ser. No. 351,746 filed Feb. 24, 1982 now U.S. Pat. No. 4,474,084 by Kazuhiko SUGANO et al. (see FIG. 2) and commonly assigned herewith. The hydraulic control system according to the present invention is different from that described in U.S. patent application Ser. No. 351,746 in the provision of the lock-up valve 17 and speed cut valve 18 for controlling the lock-up clutch L.

Referring particularly to FIG. 3, the vehicle speed cut valve 18 comprises spool 22 slidably disposed in a valve bore 21 and a spring 23 biasing the spool 22 to the left as viewed in FIG. 3. The valve bore 21 is formed with five ports 21a, 21b, 21c, 21d and 21e, while the spool 22 is formed with two lands 22a and 22b having the same diameter. The port 21a communicates with an oil conduit 24 connected with the governor valve (113, 114). The port 21d communicates with an oil conudit 29 connected with the high and reverse clutch F/C. The port 21c communicates via an oil conduit 25 with a port 26a of the lock-up valve 17. The port 21e communicates with an oil conduit 41 which is mentioned later. The port 21b is a drain port.

The lock-up valve 17 comprises a spool 27 slidably disposed in a valve bore 26, and a spring 28 biasing the spool 27 to the left as viewed in FIG. 3. The valve bore 26 is formed with five ports 26a, 26b, 26c, 26d and 26e, while the spool 27 is formed with two lands 27a and 27b having the same diameter. The port 26a commuincates with the port 21c of the vehicle speed cut valve 18 as mentioned before. The port 26b communicates with an oil conduit 30 which supplies the torque converter T/C a pressurized oil from the regulator valve 1. The port 26c communicates via an oil conduit 31 with the lock-up clutch oil chamber LC. The ports 26d and 26e are drain ports, respectively. The torque converter supply pressure is supplied to the inside of the torque converter T/C from the oil conduit 30 and the oil within the torque converter T/C is discharged to an oil conduit 32. The oil in the oil conduit 32 is drained via a pressure maintaining valve 33. The lock-up oil chamber LC communicates with the oil conduit 31 as mentioned before.

The solenoid valve 19 is arranged to open or close an opening 41a formed through the oil conduit 41 (i.e., an output oil conduit) which is connected via an orifice 43 with an oil conduit 42 which is supplied with a line fluid pressure from the regulator valve 1. The opening 41a is closed or opened by a plunger 44a of a solenoid 44. The oil conduit 41 communicates with the port 21e of the vehicle speed cut valve 18 as mentioned before. The solenoid 44 is electrically connected with an idle switch 45 which is actuated in response to an idle condition of the engine. The idle switch 45 is operatively mounted on a control member such as an accelerator (see FIG. 1) and is closed or "ON" when no depression force is applied to the accelerator and otherwise "OFF."

The operation is described.

A description is made now as to the ordinary running state wherein the depression force is applied on the accelerator.

In this case, the solenoid 44 is "OFF," so that the oil within the oil conduit 41 is discharged through the opening 41a and no pressure exists in the oil conduit 41. Therefore, the port 21e of the vehicle speed cut valve 18 is drained.

In the first or second speed ratio, the spool 4b of the 2-3 shift valve 4 is disposed in the position indicated by the right half thereof as viewed in FIG. 2 and no oil pressure is supplied to the high and reverse clutch F/C and thus no oil pressure exists in the oil conduit 29. Under this condition, since no oil pressure is supplied to the oil conduit 29, no oil pressure acts through the oil conduit 25 on the port 26a of the lock-up valve 17 irrespective of the position of the vehicle speed cut valve 18. Therefore, the spool 27 of the lock-up valve 17 assumes the position indicated by the upper half thereof as viewed in FIG. 3 under the action of the spring 28. In this position of the spool 27, the oil conduit 30 is allowed to communicate with the oil concuit 31, thus allowing the lock-up torque converter supply pressure in the oil conduit 30 to be supplied to the lock-up clutch oil chamber LC. As a result, the pressure within the lock-up clutch oil chamber LC becomes equal to that within the torque converter T/C, leaving the lock-up clutch L released.

Subsequently, when the spool 4b of the 2-3 shift valve 4 switches from the second speed ratio position indicated by the right half thereof as viewed in FIG. 2 to the third speed ratio position indicated by the left half thereof as viewed in FIG. 2, the oil pressure supplied to the high and reverse clutch F/C appears and is elevated. If the vehicle speed increases and the governor fluid pressure increases accordingly, the spool 22 of the vehicle speed cut valve 18 switches to the position indicated by the bottom half thereof as viewed in FIG. 3. In this position of the spool 22, the oil conduit 29 is allowed to communicate with the oil conduit 25, and thus the actuating pressure for the high and reverse clutch F/C starts acting on the port 26a of the lock-up valve 17. When the actuating pressure for the high and reverse clutch F/C increases and overcomes the force of the spring 28, the spool 27 of the lock-up valve 17 switches to the position indicated by the bottom half thereof as viewed in FIG. 3. When the spool 27 of the lock-up valve 17b has switched to the position indicated by the bottom half thereof, the port 26c is allowed to communicate with the port 26d which is a drain port and thus the oil within the lock-up clutch oil chamber LC is discharged through the oil conduit 31, thus putting the lock-up clutch into the engagement state thereof.

If, in the above mentioned state wherein the lock-up clutch L is engaged during operation with third speed ratio, the throttle opening degree is decreased to zero to put the vehicle into a coasting state, the system operates in the following manner. In the coasting state, since the depression force is removed from the accelerator, the idle switch 45 is turned "ON" to put the solenoid 44 into "ON." Thus, the solenoid 44 urges the plunger 44a to close the opening 41a. With the opening 41a being closed, the oil pressure in the oil conduit 41 (output oil pressure) is elevated and becomes equal to the pressure in the oil conduit 41. That is, the pressure in the oil conduit 41 becomes equal to the line pressure. Thus, the line pressure acts on the port 21e of the vehicle speed cut valve 18. Whenever the line pressure acts on the port 21e, the spool 22 of the vehicle speed cut valve 18 always switches to or is forced to assume the position indicated by the upper half thereof as viewed in FIG. 3, thus suspending the supply of the oil pressure to the oil conduit 25 so as to allow the spring 28 to push back the spool 28 of the lock-up valve 17 to the position indicated by the upper half thereof as viewed in FIG. 3. Therefore, the oil conduit 30 is allowed to communicate with the oil conduit 31 so as to release the lock-up clutch L. As will now be understood, the lock-up clutch L is released always whenever the idle switch 45 is turned "ON." Owing to this operation, the transmission of vibrations from the engine to the drive system is prevented. Further, since the engine revolution speed drops during coasting, the fuel economy improves.

If desired, the solenoid 44 is electrically connected with a kickdown switch 45A as shown in FIG. 3. The kickdown switch 45A is turned "ON" when the accelerator pedal is depressed deeply into a kickdown state. If the solenoid 44 is electrically connected with the kickdown switch 45A, the lock-up clutch L is released at kickdown and engine revolution speed is elevated depending upon the degree of slip in the torque converter T/C and thus a torque multiplication by the torque converter is obtained. Therefore, a stronger acceleration is obtained for kickdown operation.

What is claimed is:

1. A hydraulic control system for a lock-up clutch of a hydrodynamic device of an automatic transmission for a vehicle having an engine with a control member variable, in position, in response to a power demand of the engine, comprising:
    means for generating a governor fluid pressure indicative of a speed of the vehicle;
    a valve having a spool movable responsive to said governor fluid pressure, said spool being movable between a lock-up position and a non lock-up position;
    means coupled with said valve for hydraulically engaging the lock-up clutch when said spool assumes the lock-up position thereof and releasing the lock-up clutch when said spool assumes the non lock-up position thereof;
    means responsive to the position of the control member for generating an output signal when the position of the control member attains a predetermined value; and
    means coupled with said valve and responsive to said output signal for overriding said valve to move said spool to the non lock-up position thereof.

2. In a hydraulic control system for an automatic transmission for a vehicle having an engine with a control member variable in position in response to a power demand on the engine, the automatic transmission having a hydrodynamic torque transmission unit with a lock-up clutch, the automatic transmission being shiftable into a predetermined speed ratio when a predetermined friction device is hydraulically actuated,
    a source of a line fluid pressure;
    means coupled with said source for selectively supplying an actuating fluid pressure to the predetermined friction device so as to hydraulically actuate same;
    means coupled with said source for generating a governor fluid pressure which is always lower than said line fluid pressure of said source and indicative of a speed of the vehicle;
    a vehicle speed cut valve coupled with said supplying means to receive said actuating fluid pressure supplied to the predetermined friction device, said vehicle speed cut valve having an outlet port and a spool movable responsive to said governor fluid pressure between a lock-up position wherein said actuating fluid pressure is supplied to said outlet port and a non lock-up position wherein said outlet port is drained;
    means coupled with said vehicle speed cut valve and responsive to said actuating fluid pressure supplied to said outlet port for hydraulically engaging the lock-up clutch when said spool assumes said lock-up position thereof and disengaging the lock-up clutch when said spool assumes said non lock-up position;
    means responsive to the position of the control member for generating an output signal when the position of the control member attains a predetermined value; and
    means coupled with said vehicle speed cut valve and responsive to said output signal for overriding said vehicle speed cut valve to move said spool to said non lock-up position.

3. In a hydraulic control system for an automatic transmission for a vehicle having an engine with an accelerator having an idle position and a kickdown position, the automatic transmission having a hydrodynamic torque transmission unit with a lock-up clutch, the automatic transmission being shiftable into a predetermined speed ratio when a predetermined friction device is hydraulically actuated;
    a source of a line fluid pressure;
    means coupled with said source for selectively supplying an actuating fluid pressure to the predetermined friction device so as to hydraulically actuate same;

means coupled with said source for generating a governor pressure which is always lower than said line fluid pressure of said source;

vehicle speed cut valve means coupled with said supplying means to receive said actuating fluid pressure supplied to the predetermined friction device and responsive to said governor fluid pressure for supplying said actuating fluid pressure to an outlet port thereof when said governor fluid pressure is greater than a predetermined value;

a lock-up valve including a spool and a spring biasing said spool to a first position, said spool being movable against said spring to a second position responsive to said actuating fluid pressure supplied to said outlet port of said vehicle speed cut valve means;

means for hydraulically engaging the lock-up clutch when said spool of said lock-up valve assumes said second position, but releasing the lock-up clutch when said spool of said lock-up valve assumes said first position thereof;

means responsive to the accelerator for generating an output signal when the accelerator assumes at least one of the idle position and kickdown position; and means coupled with said vehicle speed cut valve and responsive to said output signal for overriding said vehicle speed cut valve to drain said outlet port of said vehicle speed cut valve.

* * * * *